United States Patent [19]
Okada et al.

[11] Patent Number: 5,621,962
[45] Date of Patent: Apr. 22, 1997

[54] METHOD OF MANUFACTURING CHISEL FOR IMPACT TOOL

[75] Inventors: Hiroshi Okada; Tetsuji Nakai, both of Nabari, Japan

[73] Assignee: Nippon Pneumatic Manufacturing Co., Ltd., Osaka, Japan

[21] Appl. No.: 419,395

[22] Filed: Apr. 10, 1995

[51] Int. Cl.⁶ ..................................................... B23P 19/02
[52] U.S. Cl. ........................... 29/525; 175/420.1; 125/41; 30/167; 30/168
[58] Field of Search ................................. 29/525; 30/167, 30/168; 125/40, 41; 173/126; 175/420.1

[56] References Cited

U.S. PATENT DOCUMENTS 4,492,278  1/1985  Leighton ............................... 175/420.1

FOREIGN PATENT DOCUMENTS

| 432066 | 4/1992 | Germany | 175/420.1 |
| 814 | of 1892 | United Kingdom | 125/41 |
| 16887 | of 1897 | United Kingdom | 125/41 |

*Primary Examiner*—David P. Bryant
*Attorney, Agent, or Firm*—Wenderoth, Lind & Ponack

[57] ABSTRACT

A chisel and a method of manufacturing a durable chisel. An axial hole is formed in a chisel so that the hole is open at the chisel tip. Non-metallic powder is then supplied into the axial hole. A core member made of cemented carbide or other material harder than the chisel body is then press-fitted into the axial hole. By inserting the core member into the hole, the non-metallic powder flows so as to fill up any space between the rear end face of the core member and the closed end of the axial hole.

3 Claims, 1 Drawing Sheet

METHOD OF MANUFACTURING CHISEL FOR IMPACT TOOL

BACKGROUND OF THE INVENTION

The present invention relates to a chisel for an impact tool and a method of manufacturing a chisel for an impact tool.

There is known in the prior art a type of impact tool used to crush or break objects such as rock beds and concrete. The objects are struck having a chisel mounted on one end of a cylinder with a piston reciprocating in the cylinder. One problem associated with this type of impact tool is that the chisel tends to wear quickly at its tip due to being repeatedly struck against the objects to be crushed.

In order to improve the durability of such a chisel, Examined Japanese Utility Model Publication 59-90581 proposed a core member, made of a material harder than the chisel, press-fit into an axial hole formed in the chisel and opening at the tip of the chisel.

In such a chisel, impacts are applied first to the chisel body and then transmitted to the core member. Thus, it is essential that the rear end face of the core member be in tight contact with the closed end of the axial hole formed in the chisel body so that the two members will act as one unit. Otherwise, stresses resulting from impact forces would concentrate on part of the non-contact portion, causing hardening of the contact and non-contact surfaces. Such hardened surfaces tend to sustain damage due to metal fatigue.

In order to solve this problem, Examined Japanese Patent Publication 3-73430 proposes to interpose a packing made of a soft metal such as lead between the closed end of the axial hole in the chisel and the rear end face of the core member.

This improved chisel has, however, a problem in that, due to unavoidable dimensional errors for the hole in the chisel, the core member and the soft metal packing, it is very difficult to bring the rear end face of the core member into tight contact with the closed end of the hole. Rather, in the initial stage of use of the chisel, the core member is likely to be in partial contact with the chisel body, so that the core member and the chisel body tend to be easily damaged.

Also, when press-fitting the core member into the hole in the chisel with the soft metal packing placed in the hole, the packing tends to displace to one side of the core member. This causes the rear end face of the core member to be brought into partial contact with the closed end face of the hole. Thus, impacts applied to the core member tend to be concentrated on the partial contact portion. The core member is thus subjected to unduly strong local forces, so that it can be easily damaged.

Moreover, in order to bring the rear end face of the core member into sufficiently tight and uniform contact with the closed end face of the hole formed in the chisel body, both of them have to be formed semispherically. Formation of such semispherical surfaces requires long periods of time and high manufacturing costs.

An object of the invention is to provide a method of manufacturing a chisel which makes it possible to bring the rear end face of the core member into tight contact with the closed end face of the hole formed in the chisel body once the core member is inserted into the hole.

SUMMARY OF THE INVENTION

According to this invention, there is provided a method of manufacturing a chisel for use in an impact tool, the method comprising the steps of supplying heat-resistant, non-metallic powder into an axial hole which is formed in a chisel body and having an open end at the tip of the chisel body. A core member which is harder than the chisel body, is then press-fitted into the axial hole.

The chisel according to the present invention comprises a chisel body formed with an axial hole having an open end at the tip of the chisel body, and a core member press-fit in the axial hole. The core member is more wear-resistant than the chisel body. Also a non-metallic powder is provided in the axial hole.

The non-metallic powder may be graphite powder or talc powder. This powder may be used singly or used after kneading with additives.

By inserting the core member into the hole, the non-metallic powder will move in the hole so as to completely fill up any and all space between the rear end face of the core member and the closed end of the hole with uniform density. Thus, the rear end face of the core member is brought into tight contact with the closed end of the hole through the non-metallic powder layer.

Other features and objects of the present invention will become apparent from the following description made with reference to the accompanying drawings, in which:

BRIEF DESCRIPTION OF THE INVENTION

FIG. 1 is a sectional view of a chisel manufactured by the method according to the present invention; and FIG. 2 is a sectional view of the same showing how the chisel is assembled.

DETAILED DESCRIPTION OF THE PREFERRED EMBODIMENT

Figure 1:
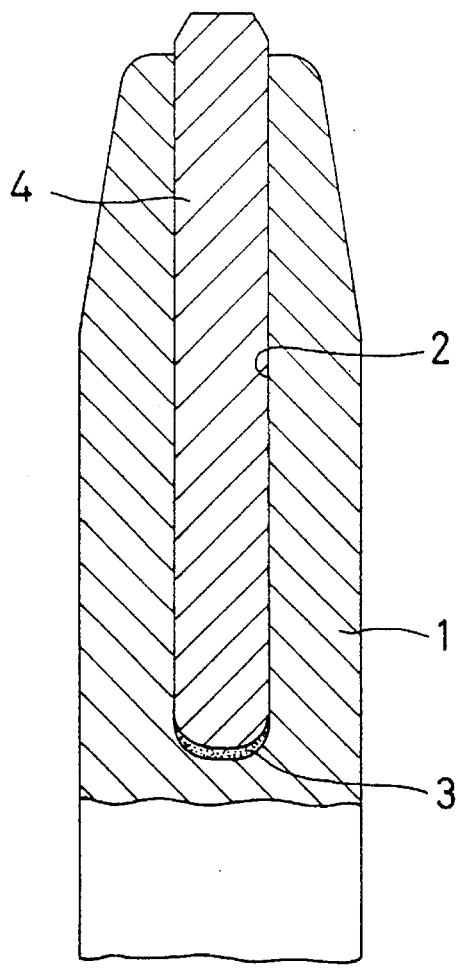

Now referring to the drawings, we shall describe one embodiment of this invention.

As shown in FIG. 1, the chisel body 1 has an axial hole 2 which opens at a tip of the chisel body. Heat-resistant non-metallic powder 3 such as graphite or talc powder is provided in the hole 2. Also, a core member 4, made of a wear-resistant material such as cemented carbide and tool steel, is press-fitted in the hole 2.

The corner of the closed end of the hole 2 is rounded off in order to reduce stress concentration. For the same purpose, the rear end face of the core member 4 is similarly rounded off.

Figure 2:
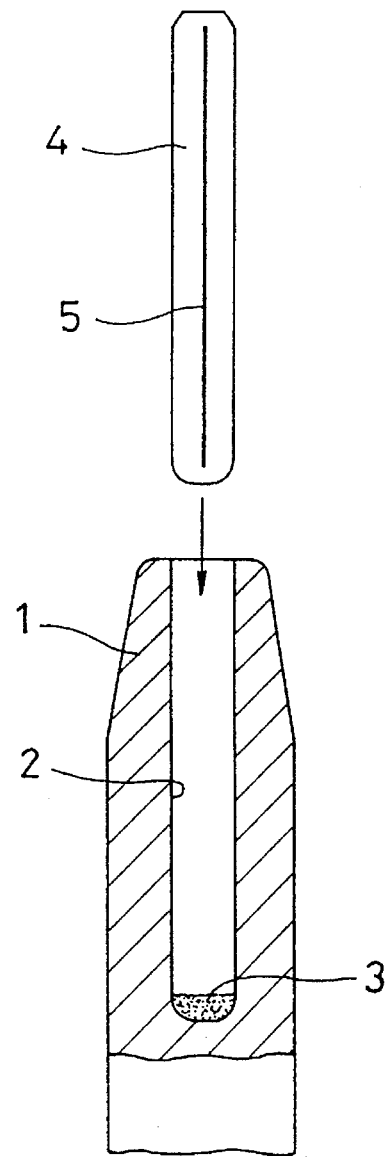

To assemble the chisel, as shown in FIG. 2, the non-metallic powder 3 is supplied into the hole 2 in the chisel body 1, and then the core member 4 is press-fitted into the hole 2.

It is preferable to apply a lubricant such as molybdenum disulfide to the inner surface of the hole 2 so that the core member 4 can be easily inserted or pressed into the hole 2.

An axial groove 5 is formed in the surface of the core member 4. It serves as a vent hole through which air in the hole 2 can escape when the core member 4 is inserted into the hole 2.

By inserting the core member 4 into the hole 2, the non-metallic powder 3 moves in the hole 2 under the pressure transmitted from the rear end face of the core member 4 so as to completely fill up any and all voids between the rear end face of the core member 4 and the closed end of the hole 2 with uniform density. Thus, the rear end face of the core member 4 is brought into tight contact with the closed end of the hole 2 without any gaps therebetween due to the non-metallic powder 3. Since the non-metallic powder is freely movable in the hole 2, it can flow into and fill up any small spaces that may be formed between the outer peripheral surface of the core member 4 and the inner surface of the hole 2 due to dimensional errors fabrication of these members.

Thus, impacts applied to the core member 4 will be borne over the entire area of the closed end face of the hole 2. Therefore, local concentrations of stress will not occur when impacts are transmitted from the chisel body 1 to the core member 4.

According to the present invention, simply by press-fitting the core member into the hole formed in the chisel body, it is possible to bring the rear end face of the core member into tight contact with the closed end of the hole through the non-metallic powder layer. It is therefore possible to reduce damage to the core member and the chisel body and thus to prolong the life of the chisel.

Since the non-metallic powder is freely movable in the hole so as to fill up any spaces or voids between the rear end face of the core member and the closed end face of the hole, the rear end face and the closed end face do not have to have any particular shapes. Also, such non-metallic powder fills up any small gaps formed between the core member and the hole in the chisel body due to dimensional errors of these members, thus preventing the core member from rattling in the hole when assembled. Thus, the outer surface of the core member and the inner surface of the hole are not required to be finished with such high accuracy, and therefore these members can be manufactured at a lower cost.

What is claimed is:

1. A method of manufacturing a chisel for use in an impact tool, the method comprising:

supplying a graphite powder, a talc powder, or a mixture of graphite and talc powder into an axial opening formed in a tip of a chisel body to provide a packing; and press-fitting a core member into the axial opening, wherein the core member is formed of a more durable material than the chisel body.

2. The method of manufacturing a chisel as claimed in claim 1, further comprising kneading the powder material with an additive prior to said supplying step.

3. A chisel for use in an impact tool, said chisel comprising:

a chisel body having a tip and being formed with an axial hole which opens at said tip of said chisel body;

a packing disposed in said axial hole and being formed of a powder of graphite or talc; and a core member press-fit in said axial hole such that said packing is disposed between said chisel body and said core member, wherein said core member is more wear-resistant than said chisel body.

* * * * *